(12) United States Patent
Riethmüller et al.

(10) Patent No.: US 12,242,253 B2
(45) Date of Patent: Mar. 4, 2025

(54) MULTIFUNCTIONAL GATEWAY UNIT, PRODUCTION SYSTEM AND METHOD FOR OPERATING A PRODUCTION SYSTEM

(71) Applicant: HOMAG GMBH, Schopfloch (DE)

(72) Inventors: Simon Riethmüller, Nagold-Vollmaringen (DE); Martin Meintel, Horb-Talheim (DE); Jochen Paul, Eggstätt (DE); Manuel Friebolin, Calw-Stammheim (DE); Benjamin Kerth, Tübingen (DE)

(73) Assignee: HOMAG GmbH, Schopfloch (DE)

(*) Notice: Subject to any disclaimer, the term of this patent is extended or adjusted under 35 U.S.C. 154(b) by 296 days.

(21) Appl. No.: 17/771,448

(22) PCT Filed: Oct. 21, 2020

(86) PCT No.: PCT/EP2020/079592
§ 371 (c)(1),
(2) Date: Apr. 22, 2022

(87) PCT Pub. No.: WO2021/078782
PCT Pub. Date: Apr. 29, 2021

(65) Prior Publication Data
US 2022/0413472 A1 Dec. 29, 2022

(30) Foreign Application Priority Data
Oct. 24, 2019 (DE) ...................... 10 2019 128 724.3

(51) Int. Cl.
*G05B 19/418* (2006.01)
(52) U.S. Cl.
CPC .................. *G05B 19/41855* (2013.01); *G05B 2219/25198* (2013.01)

(58) Field of Classification Search
CPC .... G05B 19/41855; G05B 2219/25198; G05B 2219/23161; G05B 2219/25428; G05B 2219/31093; G05B 2219/31131
See application file for complete search history.

(56) References Cited

U.S. PATENT DOCUMENTS

| | | | |
|---|---|---|---|
| 6,832,251 B1 | 12/2004 | Gelvin et al. | |
| 10,890,900 B2 | 1/2021 | Kreidler et al. | |
| 2019/0339671 A1* | 11/2019 | Yona | B33Y 50/02 |

FOREIGN PATENT DOCUMENTS

| | | |
|---|---|---|
| CN | 107003661 A | 8/2017 |
| DE | 102009028051 A1 | 2/2011 |

(Continued)

OTHER PUBLICATIONS

International Search Report of International Application No. PCT/EP2020/079592 mailed Feb. 22, 2021, 3 pages.

(Continued)

*Primary Examiner* — Charles R Kasenge
(74) *Attorney, Agent, or Firm* — Morgan, Lewis & Bockius LLP

(57) ABSTRACT

A multifunctional gateway unit may connect at least one apparatus, which is in particular used for machining, handling or storing workpieces that preferably consist of, at least in portions, of wood, wooden materials, or plastic. The multifunctional gateway unit may include, at least one data interface for connecting the gateway unit to a data server; at least one computing unit which comprises a CPU and is designed to interchange data with the data interface; at least one sensor interface which is designed to receive data from a sensor, which is associated with the apparatus, and to forward the data to the computing unit; and/or at least one output interface which is designed to receive data from the computing unit and to forward the data to at least one unit of the apparatus.

15 Claims, 1 Drawing Sheet

(56) References Cited

FOREIGN PATENT DOCUMENTS

| | | |
|---|---|---|
| DE | 112015004984 T5 | 9/2017 |
| DE | 102017128903 A1 | 6/2019 |
| EP | 2621245 A1 | 7/2013 |
| EP | 2757803 A1 | 7/2014 |

OTHER PUBLICATIONS

First Office Action for Chinese Application No. 202080075157.4 dated Nov. 29, 2024, 11 pages including translation.

* cited by examiner

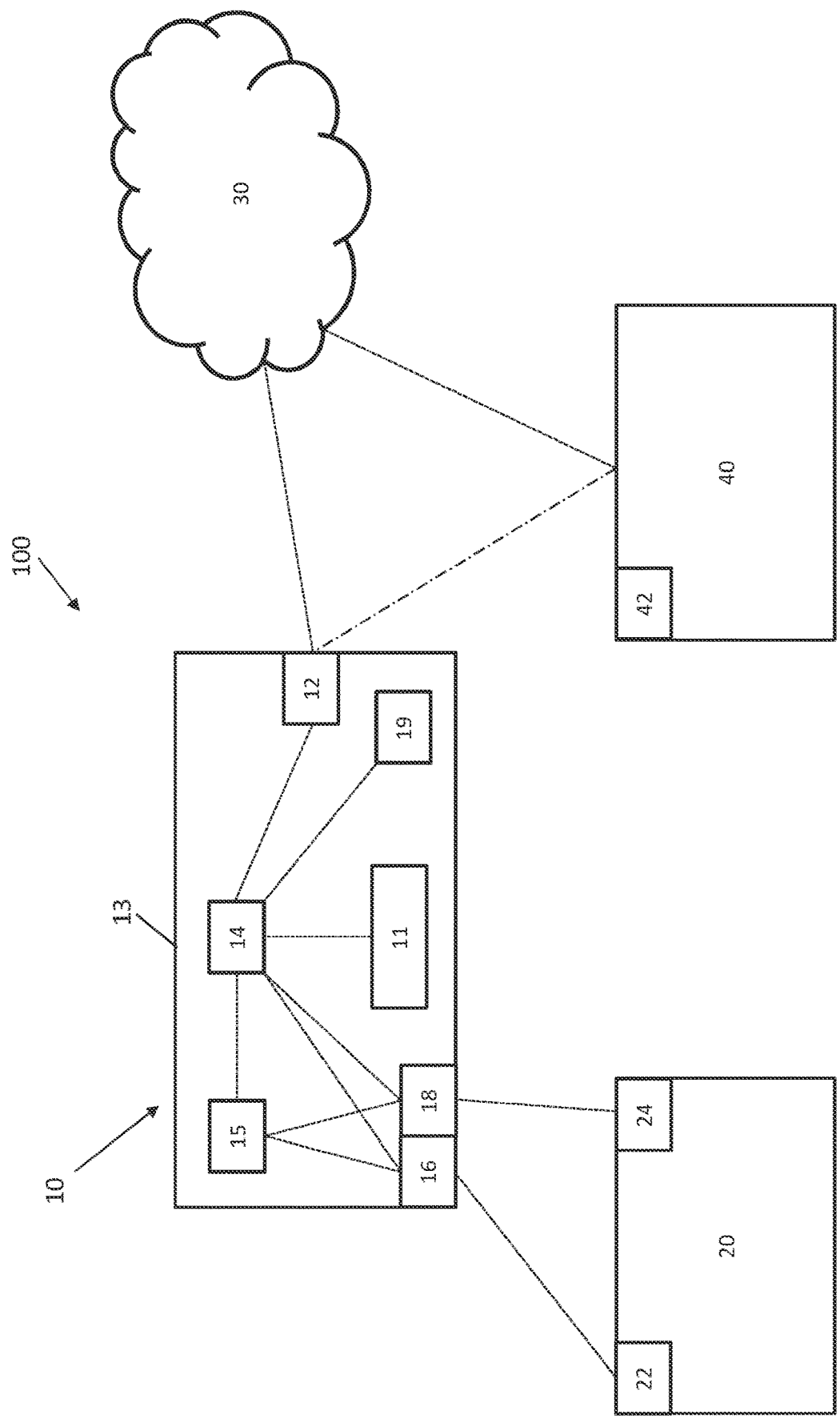

MULTIFUNCTIONAL GATEWAY UNIT, PRODUCTION SYSTEM AND METHOD FOR OPERATING A PRODUCTION SYSTEM

TECHNICAL FIELD

The invention relates to a multifunctional gateway unit for connecting at least one apparatus, which is in particular used for machining, handling or storing workpieces that preferably consist, at least in portions, of wood, wooden materials, or plastic, comprising a data server. The invention furthermore relates to a production system and a method for operating a production system.

PRIOR ART

In recent years, production systems for machining, handling or storing workpieces have become subject to ever-increasing networking. For example, machines and facilities are internally networked with one another in terms of data, and in addition more and more machines and facilities are coupled to external devices via the Internet. The term "Industry 4.0" has become established for this.

A system which enables communication with a woodworking machine via a remote data transmission interface is disclosed for example in DE 10 2017 207 993 A.

In order to be able to interconnect the relevant machines and facilities to other devices, an individual, tailored solution is usually required, which leads to a high technical outlay.

DESCRIPTION OF THE INVENTION

An object of the invention is that of allowing for networking of an apparatus, which is used in particular for machining, handling or storing workpieces, installation materials, equipment or tools, quickly and in a manner requiring little outlay.

This object is achieved according to the invention by a multifunctional gateway unit according to claim 1, a production system according to claim 9, and a method for operating a production system according to claim 12. Particularly preferred further developments of the invention are specified in the dependent claims.

The invention is based on the concept of providing a unit which is both modular and universally applicable, which allows for flexible and quick networking of apparatuses with other devices or with a data server. For this purpose, the invention comprises a multifunctional gateway unit for connecting at least one apparatus, which is in particular used for machining, handling or storing workpieces, and comprises at least one data interface for connecting the gateway unit to the data server. Furthermore, the multifunctional gateway unit comprises a computing unit which comprises a CPU and is designed to interchange data with the data interface.

The multifunctional gateway unit furthermore comprises at least one further interface. This may be a sensor interface which is designed to receive data from a sensor, which is associated with an apparatus, and to forward these data to the computing unit. Alternatively or in addition, the further interface may be an output interface which is designed to receive data from the computing unit and to forward these data to at least one unit of the apparatus.

In this way, the invention offers a plurality of functions in an integrated gateway unit, which allows for networking of apparatuses of a production system quickly and without significant (design) complexity. The gateway unit is modular, flexible and preferably mobile, so that it can be used at virtually any location and in virtually any surroundings.

By virtue of its sensor interface, the gateway unit according to the invention can be connected to a very wide range of sensors of the relevant apparatus and thus makes a significant contribution to efficient and reliable operation. In this context, the term "sensors" is to be understood broadly and refers to any devices which collect and provide information relating to the relevant apparatus. Thus, in addition to conventional sensors such as acceleration sensors, these may for example also be image or sound acquisition sensors, such as cameras or microphones.

Furthermore, by virtue of the output interface thereof, the gateway unit according to the invention can play a central role in the control of important apparatus functions, examples and particularities of at least one unit connected to the output interface being discussed in greater detail below.

Within the context of the present invention, the computing unit can be equipped in various ways. A particularly simple and flexible structure is obtained if the computing unit, according to a further development of the invention, comprises a single-board computer. A single-board computer, such as a Raspberry Pi, can be very compact in design, and is nonetheless capable of adapting very flexibly to the respective requirements, and of processing a very wide range of software and data. In the case of higher demands on flexibility or computing power, however, a multi-board computer may also be advantageous within the context of the invention.

The interfaces of the gateway unit according to the invention can in principle operate in a wired manner, for example also as a LAN interface. According to a further development of the invention, however, it is provided for at least one interface, in particular at least one data interface, to operate wirelessly. In this way, the flexibility and location independence of the gateway unit according to the invention is increased yet further. In this respect, it is particularly preferable for one of the interfaces to be provided as a WLAN or mobile communications interface, so that the above-mentioned advantages can be achieved at a high level of data security and a high transfer rate.

It is furthermore provided, according to a further development of the invention, for the gateway unit to comprise an identification means such as in particular an NFC interface or optical identification means. As a result, the coupling of the gateway unit to an apparatus or other devices, which will be discussed in greater detail in the following, is made significantly easier. Thus, during a coupling procedure, the identification means can for example not only transmit the identity and properties of the gateway unit, but rather for example also the location or other environmental parameters. In this way, an automated coupling procedure can be assisted, which requires very little user interaction.

It is furthermore provided, according to a further development of the invention, for the gateway unit to comprise a display device which is preferably selected from lighting elements, a screen, projector, loudspeaker, and vibration device. As a result, the gateway unit can provide important additional functionalities with little outlay, such as displaying the status both of the gateway unit and of coupled apparatuses and devices. Furthermore, important warning messages can also be issued, which significantly increases the operating safety. It is also possible for helpful instructions, context menus, or numerous other means of assistance to be provided for the user with little outlay.

According to a further development of the invention, the gateway unit comprises a housing, in or on which the components of the gateway unit are arranged, the housing forming an individually movable and depositable module. As a result, the mobility and versatility of the gateway unit according to the invention is further increased. It is thus possible for the gateway unit to be erected without problem at any location, without complex and laborious integration of components into existing apparatuses or facilities being required. At the same time, components of the gateway unit can be protected, by the housing, from environmental influences and damage, which may be particularly important in a manufacturing environment.

In view of the desired quick and unproblematic coupling of the gateway unit, it is provided, according to a further development of the invention, for it to comprise a plug and play unit which is designed to identify a sensor of the apparatus connected to a sensor interface, and/or a unit of said apparatus connected to the output interface, and to configure the computing unit for communication. It is thereby possible to couple the gateway unit according to the invention to any desired apparatuses and devices, without the need for particular operating steps or procedures on the part of an operator, apart from the coupling procedure via the relevant interface. The fact that, under specific framework conditions, for example for reasons of operating and working safety, it is nonetheless necessary for certain procedures to be carried out or confirmed by an operator, does not oppose this. In any case, a dramatically simplified and extremely versatile usability of the gateway unit according to the invention results, which is highly advantageous, in particular in the case of changing usage locations or changing configurations of production systems.

In this respect, it is particularly preferable for the plug and play unit to be designed to access configuration data stored in the gateway unit, and/or to access external configuration data via the data interface. The stored configuration data make it possible to achieve a coupling procedure which can optionally be performed fully automatically and at a high level of reliability within a short time. An even larger range of couplable apparatuses and devices can be achieved by the access of the plug and play unit to external configuration data via the data interface, as a result of which the coupling ability of the gateway unit according to the invention is virtually unlimited.

The above-mentioned advantages are particularly pronounced when the multifunctional gateway unit according to the invention is used in a production system according to claim 9, which further comprises an apparatus which is used for example for machining, handling or storing workpieces, installation material, equipment, or tools. Within the context of the present invention, the tools can preferably consist, at least in portions, of wood, wooden materials, plastic or the like, although the present invention is not restricted hereto. A large range of production requirements and changing configurations may arise in the case of production systems of this kind, and therefore the multifunctional gateway unit according to the invention can play a central role for increasing the efficiency, reliability and operating safety of the entire production system.

These advantages are even more pronounced if the production system, according to a further development of the invention, comprises a mobile terminal which is designed to communicate with the multifunctional gateway unit in particular via the data server. In this way, both the installation and the operation of the production system can be designed so as to be more efficient, more reliable and more user-friendly, it being possible for every component of the production system to be assigned dedicated tasks, which can be best performed by said component. It is thus possible for the mobile terminal to be designed in particular for direct interaction with an operator, and in the process to resort to established user interfaces. In this respect, the mobile terminal can be personalized, i.e. assigned to an operator, while the remaining components are for example permanently or at least temporarily assigned to a particular apparatus or a particular device. In this way, a dynamic production system is obtained, in which it is possible for an operator with a mobile terminal to couple permanently or temporarily to particular gateway units, be it directly or via a data server, optionally using the Internet.

In this respect, it is particularly preferable for the mobile terminal to comprise an identification means such as in particular an NFC interface or an optical identification means. As a result, the coupling procedure between the mobile terminal and for example a gateway unit or other devices can be assisted, it in particular also being possible for context-related information, such as the locality of the unit to be coupled, or other parameters, to be transferred, optionally also bidirectionally.

According to a further development of the invention, it is furthermore provided for the apparatus to comprise a unit that is coupled to the multifunctional gateway unit. This makes it possible to influence the operation of individual or several apparatuses of the production system by means of the multifunctional gateway unit, as a result of which a huge number of advantages can be achieved, such as in particular increased efficiency, increased operating safety, and increased flexibility. In this respect, a very wide range of units of the apparatus can be coupled and addressed, the unit preferably being selected from light indicators, such as in particular LED light strips, screen, projector, loudspeaker, vibration device, printer, machine controller, controller box, and actuator. This list shows that the production system according to the invention has an extremely wide range for increasing the efficiency, operating safety and variability of a system.

Claim 12 relates to a method according to the invention for operating the production system according to the invention. Said method is characterized in that the multifunctional gateway unit is coupled to the apparatus via the sensor interface and/or the output interface, and in addition the multifunctional gateway unit is coupled to the data server via the data interface, in particular via the Internet. The flexible and modular nature of the method according to the invention is reflected by this, by means of which method the multifunctional gateway unit can cooperate with a very wide range of apparatuses and in the process draw on a virtually unlimited range of information and instructions from the data server.

In order to ensure a coupling procedure that is as quick and as reliable as possible, according to a further development of the method according to the invention it is provided for the following steps to be carried out prior to coupling the multifunctional gateway unit to the apparatus: The multifunctional gateway unit identifies a sensor to be coupled and/or a unit to be coupled, of the apparatus, the multifunctional gateway unit checks whether an object is present in the multifunctional gateway unit, which is designed for communication with the sensor to be coupled and/or the unit to be coupled, of the apparatus, if an object is present, coupling is established between the sensor to be coupled or the unit to be coupled, of the apparatus, and the multifunctional gateway unit using the object, and/or if no object is present, a suitable object is obtained via the data interface, and subsequently coupling is established between the sensor to be coupled or the unit to be coupled, of the apparatus, and the multifunctional gateway unit using the obtained object.

According to a further development of the invention, at least one mobile terminal is coupled to the multifunctional gateway unit, namely preferably via the data server. The advantages mentioned above in connection with a mobile terminal can be particularly effectively achieved as a result.

Furthermore, according to a further development of the method according to the invention it is provided for an identification process to be carried out prior to the coupling of the at least one mobile terminal to the multifunctional gateway unit, in which the mobile terminal identifies at least one parameter of the multifunctional gateway unit and/or of a sensor and/or of a unit of the apparatus. In this way, it is possible for various items of context information to be transferred to the mobile terminal, such as the type or location of the relevant apparatus or the relevant device, various operating states, and a plurality of other parameters. This results in a quick and trouble-free coupling procedure, and it is possible to transition directly to the operation of the production system after the coupling.

Furthermore, it is provided, according to a further development of the invention, for apparatus-related data to be output from the multifunctional gateway unit to the data server and/or the mobile terminal. As a result, the units and devices used for controlling the production system can always be informed of the status and requirements of the apparatuses of the production system, which allows for quick, trouble-free and efficient operation of the production system.

Alternatively or in addition, according to a further development of the invention, apparatus-related data or instructions can be passed from the data server and/or the mobile terminal to the multifunctional gateway unit. In this way, the various devices or means of the production system can directly influence the operation of the various apparatuses, which has corresponding advantages for the flexibility, productivity, and also trouble-free nature of the system as a whole.

According to a further development of the invention, it is furthermore provided that the mobile terminal is preferably coupled to the multifunctional gateway unit via the data server, and subsequently at least one sensor and/or at least one unit of the apparatus is coupled to the multifunctional gateway unit using the mobile terminal. In this way, the mobile terminal can be used for assisting or controlling the coupling procedure between the multifunctional gateway unit and the relevant apparatus. As a result, not only is the reliability of the coupling procedure between the gateway unit and the apparatus increased, but rather the range of apparatuses that can be coupled to the gateway unit is significantly increased. It is thereby possible for example for the coupling procedure to be assisted or at least reconfirmed by means of the mobile terminal, so that the mobile gateway unit can also be coupled to entirely unknown or new apparatuses, or in any case apparatuses which have hitherto not been coupled to the gateway unit. This underlines the flexible nature, which is adaptable in an entirely novel manner, of the production system according to the invention and of the method according to the invention.

It is furthermore provided, according to a further development of the invention, for the multifunctional gateway unit to display the status of at least one sensor and/or of at least one unit of the apparatus. This additional function can be achieved with minimum outlay, and nonetheless significantly increases the reliability and operating safety of the production system according to the invention.

BRIEF DESCRIPTION OF THE FIGURE

FIG. 1 schematically shows an embodiment of a production system according to the invention, comprising a multifunctional gateway unit according to the invention.

DETAILED DESCRIPTION OF PREFERRED EMBODIMENTS

Preferred embodiments of the invention are described in detail in the following, with reference to the accompanying drawing.

A production system 100 according to a preferred embodiment of the invention is shown schematically in FIG. 1. The production system is used for machining, handling (for example relocating or transporting) or storing a wide range of objects, and comprises, for this purpose, at least one apparatus 20. The objects can for example be workpieces, but for example also tools, consumable materials, equipment, or the like. In the present embodiment, the apparatus 20 is designed for machining, handling and storing workpieces that consist, at least in portions, of wood, wooden materials, plastic or the like, as are widely used in the field of furniture and component industry. Specifically, the apparatus 20 can thus for example be a machine tool, for example for machining or coating workpieces, or for example a conveying device, or a shelving or storage system.

In order to be able to acquire various parameters of the apparatus 20, the apparatus 20 comprises at least one, but preferably a plurality of, sensors 22, such as acceleration sensors, image sensors (for example cameras), sound sensors (for example microphones), movement sensors, etc.

Furthermore, the apparatus 20 comprises at least one coupled unit 24 which is used for implementing or supporting various functions on the apparatus. The coupled unit 24 can thus for example be a light indicator, for example LED light strips, which can for example assist an operator with positioning a workpiece in the machining region or depositing it in a particular storage compartment, or removing it therefrom. The coupled unit 24 can, however, also be a wide range of other devices, such as an output device in the form of a screen, projector, loudspeaker, a vibration device, or a printer, in order to output information or instructions to the machine and/or an operator. A controller box or a part of a machine controller can also function as the coupled unit 24. It is optionally also possible for actuators or other active components of the apparatus 20 to be addressed directly as the coupled unit 24. The communication with the coupled unit 24 will be explained in greater detail in the following.

Furthermore, the production system 100 comprises the functional gateway unit 10 which, in the present embodiment, comprises a substantially cuboidal housing 13 and is thus designed as a gateway cube. The components of the multifunctional gateway unit 10 which are shown in FIG. 1 are arranged in the housing 13, the "cube" being designed, in terms of size and weight, such that it can be moved without problem by an operator, and can be deposited at any desired location. The housing 13 furthermore comprises, although not shown in FIG. 1, fittings such as eye arrangements, magnet holders, or the like, in order to attach the housing 13, if required, at least temporarily, to the apparatus 20 or to another suitable location.

As shown in FIG. 1, the multifunctional gateway unit 10 comprises a data interface 12 which is used to connect the gateway unit 10 to a data server 30. The data server 30 can in principle be arranged locally (for example in the production hall). However, the data server 30 is frequently provided in the "cloud", i.e. the data interface 12 is designed to access the data server 30 via an Internet connection or a similar connection. In this respect, it is preferable for the data interface 12 to operate wirelessly, and for example to be designed as a WLAN or mobile communications interface. Alternatively or in addition, however, the gateway unit 10 can also comprise a LAN interface for connection to the data server 30.

Furthermore, the multifunctional gateway unit comprises a computing unit 14 which, in the present embodiment, is designed as a single-board computer, for example of the Raspberry Pi type. The computing unit 14 is used to interchange data with the data interface 12 and further units and interfaces of the multifunctional gateway unit 10, and to process these data.

Furthermore, in the present embodiment the multifunctional gateway unit 10 comprises two further interfaces, specifically a sensor interface 16 and an output interface 18. The sensor interface 16 is used to receive information and/or data from one of the above-described sensors 22 of the apparatus 20 and to forward these to the computing unit 14. In contrast, the output interface 18 is used to receive data from the computing unit 14, and to in turn forward these to at least one of the above-described coupled units 24 of the apparatus 20.

In view of the sensors 22 or units 24 to be connected to said interfaces 16 and 18, respectively, the multifunctional gateway unit 10 comprises a plug and play unit 15. This is used to identify a sensor 22 of the apparatus 20 connected to a sensor interface 16 or a unit 24 of said apparatus connected to the output interface 18, and to configure the computing unit for communication. Thus, in principle no user intervention is required for bringing a connected sensor 22 or a connected unit 24 into operation, although depending on the use case user interventions may be expedient.

In the course of a configuration procedure, the plug and play unit 15 either accesses configuration data stored in the gateway unit 10 or downloads said data via the data interface 12 from an external source, such as the data server 30 or another suitable data server.

Furthermore, in the present embodiment the multifunctional gateway unit 10 comprises an NFC interface 19 which is used for rapid identification and for rapid data exchange with external devices. Alternatively, other identification means, such as optical identification means, can also be used.

Furthermore, in the present embodiment the multifunctional gateway unit 10 comprises a display device in the form of LED lighting elements 11. These are used, in the present embodiment, for displaying the status of connected sensors 22 or units 24, or also of the gateway unit 10 itself, and optionally for outputting warning messages or other indications. However, more complex display devices, such as a screen, a projector, a loudspeaker, or a vibration device, as well as combinations thereof, can also be provided.

Furthermore, in the present embodiment the production system 100 comprises a mobile terminal 40, which may be designed for example in the manner of a smartphone, tablet computer, or other portable computers. The mobile terminal 40 is designed to communicate with the multifunctional gateway unit 10, it being possible for this communication to take place for example directly via the data interface 12 of the gateway unit 10, or indirectly via the data server 30. In this respect, it should be noted that, if necessary, it is also possible to switch between the two types of communication, so that for example communication takes place via the data server 30 only if data from the data server 30 are required for the current action, while in other cases direct communication between the mobile terminal 40 and the gateway unit 10 takes place, for example via a WLAN or Bluetooth connection.

In the present embodiment, the terminal 40 comprises an NFC interface, so that identification and an exchange of basic data, as a basis for the coupling procedure, can already take place before coupling of the mobile terminal 40 to the gateway unit 10. As a result, the mobile terminal can in particular also receive information relating to the current location and the components of the production system 100.

The operation of the production system 100 according to the invention takes place for example as follows: An operator equipped with a mobile terminal 40 approaches the multifunctional gateway unit 10 and carries out a first identification of the gateway unit 10 by means of the NFC interfaces 42 and 19. In this respect, the mobile terminal 40 receives information relating to the location and the operating state of the gateway unit 10, but optionally also information relating to units connected to the gateway unit 10, such as sensors 22, coupled units 24, data servers 30, provided these are already coupled to the gateway unit 10.

Subsequently, optionally after reconfirmation by an operator, coupling between the mobile terminal 40 and the gateway unit 10 at the data interface 12 takes place, optionally with interposition of the data server 30. The mobile terminal 40 is now connected to the gateway unit 10 in such a manner that, by using the mobile terminal 40, the operation of the computing unit 14 can be controlled as well as the connected units 22 and 24 can be manipulated/influenced. In this way, various processes of the production system can be controlled using the mobile terminal. For example, in a first phase the configuration of the production system can also be assisted, for example if a new sensor 22 is connected to the sensor interface 16. In this case, as long as it is in principle possible for automatic coupling of the sensor 22 to be achieved by means of the plug and play unit, the operator can be requested, by the mobile terminal 40, to approve the coupling of the sensor 22, to confirm the sensor type, to perform specific sensor configurations, etc. The mobile terminal 40 can, of course, also carry out or assist corresponding procedures in view of the coupling of units 24 to the output interface 18 or the coupling of the data server 30 to the data interface 12.

In addition to these configuration procedures, the mobile terminal 40 can, however, also be used for monitoring, and optionally also for purposefully controlling, the entire production system 100, and in particular the apparatus 20. It is thus possible for apparatus-related data, such as the state of the apparatus 20 or the type and number of workpieces already machined, handled and stored, to be displayed on the mobile terminal 40. In addition, the operator or optionally also a software module can also issue instructions to the apparatus 20, for example what workpieces are to be machined, handled or stored in what way. In this way, the mobile terminal fulfils its central role in the control and monitoring of the production system 100.

In this respect, it is particularly important for the mobile terminal, which is usually temporarily associated with a particular operator, to be able to be coupled quickly and without problem to any multifunctional gateway units 10. Thus, an operator equipped with a mobile unit 40 can move through a larger production system 100 comprising a plurality of multifunctional gateway units 10 and can couple, as required and quickly, to the relevant gateway unit, for example in order to check the status of the connected devices or to issue instructions. In the further progression, the operator can also quickly decouple form said gateway unit 10 again, and subsequently couple without problem and quickly to a further gateway unit.

The same considerations apply correspondingly for the gateway units 10, which can also be used quickly and without problem at different locations of a production system, and optionally installed, coupled and operated in a manner assisted by a mobile terminal 40.

The invention claimed is:

1. A method for operating a production system comprising an apparatus and a multifunctional gateway unit, the apparatus being configured to be used for machining, handling or storing workpieces that include at least in portions of wood, wooden materials, or plastic, the multifunctional gateway unit being configured to connect the apparatus to a data server and comprising (i) at least one data interface for connecting the multifunctional gateway unit to a data server, (ii) at least one computing unit which comprises a central processing unit (CPU) and is configured to interchange data with the at least one data interface, (iii) at least one sensor interface which is configured to receive data from a sensor, which is associated with an apparatus, and to forward the data from the sensor to the at least one computing unit, and (iv) at least one output interface which is configured to receive data from the at least one computing unit and to forward the data from the at least one computing unit to at least one unit of the apparatus, wherein the method comprises:
coupling the multifunctional gateway unit to the apparatus via at least one of the at least one sensor interface and the at least one output interface; and
coupling the multifunctional gateway unit to the data server via the at least one data interface and via the Internet;
wherein before the coupling of the multifunctional gateway unit to the apparatus, one or more of the following operations are carried out:
the multifunctional gateway unit identifies at least one of the sensor of the apparatus to be coupled and the at least one unit of the apparatus to be coupled;
the multifunctional gateway unit checks whether an object is present in the multifunctional gateway unit configured for communication with at least one of the sensor of the apparatus to be coupled and the at least one unit of the apparatus to be coupled;
if the object is present, coupling between the sensor of the apparatus to be coupled or the at least one unit of the apparatus to be coupled, and the multifunctional gateway unit is established using the object; or
if no object is present, another object is obtained via the at least one data interface, and subsequently coupling between the sensor of the apparatus to be coupled or the at least one unit of the apparatus to be coupled, and the multifunctional gateway unit is established using the obtained another object.

2. The method according to claim 1, wherein the at least one computing unit comprises a single-board computer or a multi-board computer.

3. The method according to claim 1, wherein the at least one data interface is configured to operate wirelessly and is configured as a wireless local area network (WLAN) or a mobile communications interface.

4. The method according to claim 1, further comprising an identification means including a near field communication (NFC) interface or an optical identification means.

5. The method according to claim 1, further comprising a display device, comprising at least one of lighting elements, a screen, a projector, a loudspeaker, or a vibration device.

6. The method according to claim 1, further comprising a housing in or on which components of the multifunctional gateway unit are arranged, the housing forming an individually movable and depositable module.

7. The method according to claim 1, further comprising a plug and play unit configured to identify at least one of (i) the sensor of the apparatus connected to the at least one sensor interface and (ii) the at least one unit of the apparatus connected to the at least one output interface, and to configure the at least one computing unit for communication.

8. The method according to claim 7, wherein the plug and play unit is configured to perform at least one of the following: accessing configuration data stored in the multifunctional gateway unit and accessing external configuration data via the at least one data interface.

9. The method according to claim 1, wherein the production system further comprises:
a mobile terminal which is configured to communicate with the multifunctional gateway unit via the data server, wherein the mobile terminal comprises an identification means including an NFC interface or an optical identification means.

10. The method according to claim 1, wherein the at least one unit is coupled to the multifunctional gateway unit and comprises at least one of a light indicator, a screen, a projector, a loudspeaker, a vibration device, a printer, a machine controller, a controller box, and an actuator.

11. The method according to claim 1, wherein at least one mobile terminal is coupled to the multifunctional gateway unit, via the data server.

12. The method according to claim 11, wherein prior to the coupling of the at least one mobile terminal to the multifunctional gateway unit, an identification process is carried out, in which the at least one mobile terminal identifies at least one parameter of at least one of the multifunctional gateway unit, the sensor of the apparatus, and the at least one unit of the apparatus.

13. The method according to claim 1, wherein apparatus-related data are passed from the multifunctional gateway unit to at least one of the data server and at least one mobile terminal; or wherein apparatus-related data or instructions are passed from at least one of the data server and the at least one mobile terminal to the multifunctional gateway unit.

14. The method according to claim 1, wherein at least one of the sensor and the at least one unit of the apparatus is coupled to the multifunctional gateway unit using a mobile terminal.

15. The method according to claim 1, wherein the multifunctional gateway unit displays a status of at least one of the sensor and the at least one unit of the apparatus.

* * * * *